(12) United States Patent
Moran et al.

(10) Patent No.: US 6,525,749 B1
(45) Date of Patent: *Feb. 25, 2003

(54) APPARATUS AND METHOD FOR SUPPORTING THE IMPLICIT STRUCTURE OF FREEFORM LISTS, OUTLINES, TEXT, TABLES AND DIAGRAMS IN A GESTURE-BASED INPUT SYSTEM AND EDITING SYSTEM

(75) Inventors: Thomas P. Moran, Palo Alto, CA (US); Patrick Chiu, Menlo Park, CA (US); William Van Melle, Los Altos, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,883

(22) Filed: Oct. 25, 1996

Related U.S. Application Data

(63) Continuation of application No. 08/176,150, filed on Dec. 30, 1993, now abandoned.

(51) Int. Cl.[7] .............................. G09G 5/00; G09G 5/08
(52) U.S. Cl. ...................... 345/863; 345/156; 345/173; 345/179
(58) Field of Search ................................ 395/326, 358, 395/761, 804; 345/326–358, 863, 173, 156, 179

(56) References Cited

U.S. PATENT DOCUMENTS

| | | | | | |
|---|---|---|---|---|---|
| 5,181,129 A | * | 1/1993 | Sato et al. | .................. | 358/494 |
| 5,220,649 A | * | 6/1993 | Forcier | ........................ | 395/148 |

(List continued on next page.)

FOREIGN PATENT DOCUMENTS

| | | |
|---|---|---|
| EP | A-0 565 872 | 10/1993 |
| WO | WO-A-92 16900 | 10/1992 |

OTHER PUBLICATIONS

Lipscomb, A Trainable Gesture Recognizer, Pattern Recognition, 24 (1991) No. 9.

(List continued on next page.)

*Primary Examiner*—Hosain T. Alam
(74) *Attorney, Agent, or Firm*—Fay, Sharpe, Fagan, Minnich & McKee, LLP

(57) ABSTRACT

A system features a data input scheme in which the nature of the entered data is irrelevant until the requirement made to perform a function with respect to that data. It is only when it becomes necessary to perform a function with respect to the data that the determination of the nature of the data become important. The desired function, which may include editing, rearranging, moving, etc., then results in a determination of the nature of the data in order to enable implementation of that specific function. The nature of the data can be determined to be in the form of a list, table, or diagram. To this end, a screen oriented display processing system is provided for the entry of informational data including a display means, a data entry means for entering informational data on the display means, a gesture entering means for entering handwritten gestural data on the display, the gestural data representing a gesture associated with at least a portion of the informational data on the display, an assignment means responsive to the entry of the gesture for assigning a function representative of the gesture to the portion of the informational data, and an implementing means responsive to the assignment means for implementing the function on the said portion of the informational data.

47 Claims, 18 Drawing Sheets

U.S. PATENT DOCUMENTS 5,231,698 A * 7/1993 Forcier ...................... 395/146
5,347,295 A * 9/1994 Agulnick et al. ........... 345/156

OTHER PUBLICATIONS

European Search Report for EP 94 30 9699.

"Symbolic Construction of a 2–D Scale–Space Image," IEEE Transactions on Pattern Anaysis and Machine Intelligence, Eric Saund, Aug. 1990, vol. 12, No. 8.

"Issues in Combining Marking and Direct Manipulation Techniques", Gordon Kurtenbach and William Buxton, Nov. 11–13, UIST 1991, pp. 137–144.

aha! InkWriter Quick Reference Guide and Handbook, aha! Software Corporation, Copyright 1993.

* cited by examiner

Wall Street Journal
[USA Today
Los Angeles Times

FIG. 6(a)

Wall Street Journal
USA Today          150
Los Angeles Times

FIG. 6(b)

Wall Street Journal
USA Today
Los Angeles Times
152

FIG. 6(c)

Wall Street Journal     150
USA Today
Los Angeles Times

FIG. 6(d)

Wall Street Journal    154
USA Today         ⟨
Los Angeles Times

FIG. 6(e)

Wall Street Journal
Los Angeles Times

FIG. 6(f)

Wall Street Journal
USA Today
Los Angeles Times
156

FIG. 6(g)

Wall Street Journal
Los Angeles Times     150
USA Today

FIG. 6(h)

*Wall Street Journal*
> *USA Today*
*Los Angeles Times*

FIG. 6(i)

*Wall Street Journal*
*USA Today*

*Los Angeles Times*

FIG. 6(j)

*Wall Street Journal*
*USA Today*
*Los Angeles Times*

FIG. 6(k)

*USA Today*
*Wall Street Journal*
*Los Angeles Times*

FIG. 6(l)

*USA Today*
*Wall Street Journal*
*Los Angeles Times*

FIG. 6(m)

Wall Street Journal
USA Today — 162
Los Angeles Times

FIG. 8(a)

Wall Street Journal
USA Today
Los Times

FIG. 8(b)

Wall Street Journal
USA Today
Los [Angeles] Times

FIG. 8(c)

Wall Street Journal
USA Today
Los Angeles Times

FIG. 8(d)

Wall Street Journal
USA Today — 164
Los Angeles Times

FIG. 8(e)

Wall Street Journal
USA Angeles Today
Los Times

FIG. 8(f)

Wall Street Journal  
USA Today  
Los Angeles Times  
166  
150

FIG. 8(g)

Wall Street Journal  
Angeles  
USA Today  
Los Times

FIG. 8(h)

Wall Street Journal  
USA Today  168  
Los Angeles Times

FIG. 8(i)

Wall Street Journal  
USA          Today  
Los Angeles Times

FIG. 8(j)

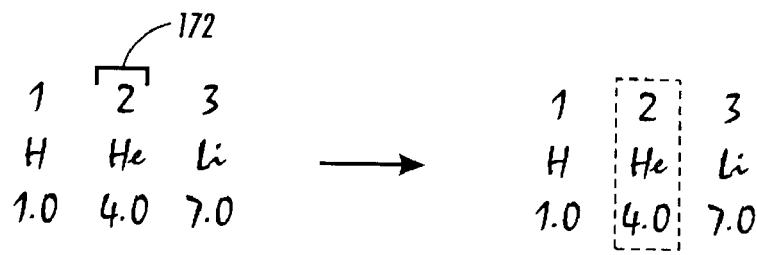
FIG. 9(a)          FIG. 9(b)
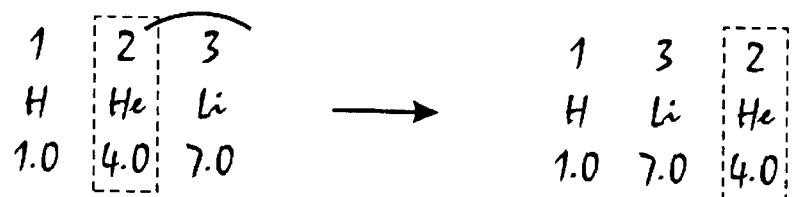
FIG. 9(c)          FIG. 9(d)
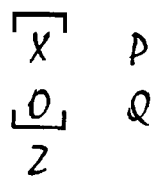      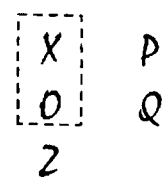
FIG. 9(e)          FIG. 9(f)
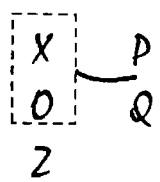      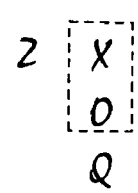
FIG. 9(g)          FIG. 9(h)

|   1   |   2   |   3   |
|-------|-------|-------|
| [ H   |  He   |  Li ] |
|  1.0  |  4.0  |  7.0  |

FIG. 10(f)

|   1   |   2   |   3   |
|-------|-------|-------|
|   H   |  He   |  Li   |
|  1.0  |  4.0  |  7.0  |

|   1   |   2   |   3   |
|-------|-------|-------|
|  1.0  |  4.0  |  7.0  |
|   H   |  He   |  Li   |

FIG. 10(i)

|  | Slides | Time | Speakers |
|---|---|---|---|
| Introduction | 2 | 10 | Hillary |
| Economy | 6 | 25 | Bill C. |
| Health | 4 | 20 | Hillary C. |
| Environment | 8 | 15 | Al G. |
| Conclusion | 2 | 10 | Bill |

FIG. 15

|  | Slides | Time | Speakers |
|---|---|---|---|
| Introduction | 2 | 10 | Hillary |
| Economy | 6 | 25 | Bill C. |
| Health | 4 | 20 | Hillary C. |
| Environment | 8 | 15 | Al G. |
| Conclusion | 2 | 10 | Bill |

APPARATUS AND METHOD FOR SUPPORTING THE IMPLICIT STRUCTURE OF FREEFORM LISTS, OUTLINES, TEXT, TABLES AND DIAGRAMS IN A GESTURE-BASED INPUT SYSTEM AND EDITING SYSTEM

This application is a continuation, of application Ser. No. 08/176,150, filed Dec. 30, 1993, now abandoned.

RELATED APPLICATIONS

This application is related to Ser. No. 07/869,554, filed Apr. 15, 1992, Ser. No. 07/868,559, filed Apr. 15, 1992, Ser. No. 08/101,646, filed Aug. 4, 1993, Ser. No. 08/101,645, filed Aug. 4, 1993, Ser. No. 08/136,360, filed Oct. 14, 1993, entitled Apparatus and Method for Generating Place-holders in a Gesture Based Input System, Ser. No. 08/175,853, filed Dec. 30, 1993, entitled Apparatus and Method for Executing Multiple Concatenated Conmmands Gestures in a Gesture Based Input System, Ser. No. 08/175,850, filed Dec. 30, 1993, entitled Apparatus and Method For Correcting and/or Aborting Command Gestures In a Gesture Based System, Ser. No. 08/175,841, filed Dec. 30, 1993, entitled Apparatus and Method for Altering Gestures In a Gesture Based Input System, and Ser. No. 08/175,846, filed Dec. 30, 1993 entitled Apparatus and Method for Translating Graphic Objects and Commands with Direct Touch Input In a Touch Based Input System, all assigned to the present assignee, the disclosures of which are in their entirety, each specifically incorporated by reference herein.

FIELD OF THE INVENTION

The present invention relates to input and editing systems and particularly to manual data entry and gesture-based command systems employing input, editing and display functions.

BACKGROUND OF THE INVENTION

A freeform graphics system is one in which a user can, by various means, input graphical data objects into a two-dimensional space and then edit the objects and their positions in the space. The system is "freeform" in two senses. First, the graphical objects themselves may be of any shape, dependent only on the means provided by the input methods. Second, there are no constraints on where the graphical objects may be positioned in the space; the means for inputting and editing the objects allows the user to freely position and reposition objects. All of the graphical objects are independent of each other in that their relationship to each other is determined only by their placement in the 2-D space.

This second sense of freeform, which is also called "unstructured" in this document, is the more important. A simple example of a freeform graphics system is a child's "rubber stamp" graphics application, in which the user can use buttons (the rubber stamps) and a pointing device to input ("stamp") graphic objects anywhere on the drawing surface and then use the pointing device to move the objects around on the surface. An example of a non-freeform ("structured") system is a simple text editor, in which all the characters are organized into an underlying "string" structure." A character cannot be placed anywhere on the 2-D display, but only in positions where it can fit into the string structure (e.g. to move some characters to the right, some "space" characters must be typed into the string to cause them to be pushed over).

A very useful type of freeform graphics system is a "scribbling" system in which the user can input freeform marks by simply drawing ("inking") them in a freehand manner. Any such mark entered is a freeform graphical object in the system; that is, the mark can be any shape the user chooses to draw it, and it can be drawn anywhere on the drawing surface. The input can be accomplished by a variety of means of sensing a freely movable input device, such as a stylus, a mouse, or even a finger (sensed by pressure or optical means), etc.

Editing and control operations can be performed on the graphical objects in a freeform graphics system by giving commands to the system. Conmmands can be given by conventional techniques, such as keyboard-based and menu-based techniques. But in a "gesture-based" input system such as a pen-based notebook computer or large scale display known as a Liveboard (a trademark of Xerox Corporation), such control functions may be instituted by a command gesture. A command gesture is a handrawn stroke that is created with a stylus input device and interpreted by the system as designating an action for the system to perform.

A gesture-based system is capable of detecting that a user is entering a gesture command on a drawing surface instead of data usually by some action taken on the part of the user. Such an input action may entail holding or exerting pressure on a button on the stylus. The user instructs the system to execute the command by lifting the input device (e.g. stylus) from the drawing surface. Other methods are also possible. The system may recognize the input as an executable command, without any special user action, or may act in response to a double tap on the drawing surface, etc.

A common activity for users of gesture based computing systems, whether white-board-sized or notebook-sized, is informal scribbling in handwriting and sketches, whether for purposes of communicating with others or for making notes to oneself. The whiteboard system on the Liveboard is a prime example of a system to support this kind of activity. Scribbling systems treat this material as unstructured images or as collections of stroke objects.

A great deal of such scribbling activity involves generic structures—lists, outlines, text, tables, and diagrams. To be effective, scribbling systems must support the creation and editing of these structures. Without such support, for example, the simple task of moving an item in a list can be tedious (move a segment of the list to make space for the item at the new location, move the item, close up the old space). This almost always takes too much time for users to actually perform.

Users of course could be provided with a set of explicit facilities for these generic structures. Thus, for example, the user declares that he/she wants to work with a table, and the system provides a tabular array which the user can fill out and manipulate. However, the problem is that users who are working in a "scribbling manner" do not always know beforehand what structure they want. These structures are emergent. For example: users jot a couple of phrases; then they decide to make a more extensive list; then they begin to mark properties of a couple of items of the list; then they want to make these properties a second column (i.e., a table); then they want to make a sketch which violates any list or tabular convention; and so on.

Thus it is seen that the structuring is partial, both temporally and spatially. Sometimes the user wants to consider the material as a list, e.g., to re-order it, and other times he/she desires to consider it as a literal image and sketch on it.

Furthermore, even if the user considers the material as a list, he/she may not want to regard the whole page as a list, e.g., just the left half of the page. It is desirable to have a system that can support this kind of fluid process. However, requiring users to explicitly declare structures often inhibits the natural flow of this kind of work.

There are scores of graphical systems supporting text, lists, outlines, tables, and diagrams. There are however very few that handle such input with a hand-held manually manipulable input device such as a stylus or pen. Usually, pen input is immediately recognized as characters, and then processed as conventional text. The commercial field of pen-based computing is very active and stroke-based outlining systems are beginning to appear. Such systems appear to be based on a notion of lined paper. The user declares a page to be a list, and then lines appear, creating a column of wide rectangular cells for the list items. See FIG. 3 for an example of one such system. Every stroke belongs to one of the cells 50, and in this way all strokes are grouped into list items. Every non-empty cell has a bullet 52 that represents the group of strokes in the cell 50. There are several gestures on the lines and bullets for manipulating the list structure, e.g., a line gesture from a bullet to a line moves the item, a pigtail gesture on a bullet deletes the item, and a gesture up or down from a line moves the line up or down (i.e., changes the size of the cell).

This system as well as other conventional systems however suffer from the inability to accept, modify or alter freeform information. Such information can take the form of text, graphics, tabular data and other forms of information all includable within the foregoing formats. Conventional data entry unfortunately cannot be entered in a freehand form without constraints such as defined borders or defined input areas. Editing operations can only act upon the entire information contained within the defined borders or input areas, not individual strokes within such borders.

It is desirable to have a system that would allow data of any type to be entered in a freeform manner without defined constraints such as borders or defined input areas or structures, not necessarily visible, e.g. text, and allow editing operations to be entered in a similar manner with editing operations being determined by the entered edit commands and with the constraints determining the nature of the data arising after entry of an editing command, rather than before.

OBJECTS AND SUMMARY OF THE INVENTION

It is an object of the present invention to overcome the disadvantages associated with the conventional systems described above.

The above object is achieved by a system which features a data input scheme wherein the structure of the entered data is irrelevant until the requirement is made to perform an operation with respect to that data. It is only when it becomes necessary to perform an operation with respect to the data that the determination of the structure of the data becomes important. The desired operation, which may include editing, rearranging, moving, etc., then results in a determination of the structure of the data in order to enable implementation of that specific operation. The structure of the data can be determined to be in the form of a list, table, or diagram. The entered data is freeform, meaning that its structure is not determined at entry. The data as entered can be free hand, scanned, graphic, textual, pictorial, typed, etc. It is treated by the system as freeform, meaning that it is treated merely as a series of strokes. Specifically, the scheme described above provides support for such forms of data in a flexible way—both temporally (so that the user does not have to permanently "declare" structural modes) and spatially (so the user can delimit the extent of the structured material). The scheme is based on a set of design principles for specifying a set of structural/spatial models for any type of information on the display surface, a set of gestures for choosing particular structures and for operating on the information defined by such structures, and a set of system procedures for recognizing the structures and carrying out operations according to the structural models. These design principles are used to support handwritten lists (simple vertical lists), outlines (indented lists), text (within lists and outlines), tables (rows and columns), and diagrams (nodes and links).

In accordance with the present invention, a screen oriented display processing system is provided for the freeform entry of informational data including a display means, a data entry means for entering informational data on said display means, a gesture entering means for entering freeform gestural data on said display, said gestural data representing a gesture associated with at least a portion of said informational data on said display, an assignment means responsive to the entry of said gesture for assigning an operation representative of said gesture to said portion of said informational data, and an implementing means responsive to said assignment means for implementing said operation on said portion of said informational data. The assignment means includes means for establishing a determination of structure of said informational data sufficient to accomplish said operation.

In accordance with another aspect of the present invention, a graphic editing system is provided including a data interface surface and user controllable means for generating information on said surface. The system comprises first means responsive to a user action that generates a line image on the surface for performing an operation on at least a portion of said information, said line image having a set of instructions associated therewith, second means responsive to said set of instructions for selectively analyzing, organizing, and rearranging information displayed on said surface, and third means for implementing said operation on said information according to said instructions.

In accordance with another aspect of the invention, a graphic editing system is provided including a data interface surface and user controllable means for generating information on said surface. The system comprises first means responsive to a user action that generates a line image on said surface for selecting at least a portion of said information, said first line having a set of instructions associated therewith, second means responsive to said set of instructions for selectively analyzing, organizing and rearranging information on said surface, and third means responsive to said first user action for interpreting said information on said surface in accordance with said instructions.

In accordance with another aspect of the invention, a graphic editing system including a data interface surface and user controllable means for generating information on said surface. The system comprises first means responsive to a first user action that generates a first line on said surface for selecting data thereon, second means responsive to said second user action subsequent to said first user action that generates a second line image having a set of instructions associated therewith, third means responsive to said instructions for analyzing, organizing and rearranging information on said surface associated therewith, and means for interpreting said information on said surface in accordance with said instructions.

In accordance with another aspect of the invention, a graphic editing system is provided including a data interface surface and user controllable means for generating information on said surface the system comprises first means responsive to a user action that generates a line image on the surface for performing an operation on at least a portion of said information, second means responsive to said line image generation for selectively determining a table, diagram, list, and outline model structures for said information on said surface in accordance with said operation, third means for identifying said information affected by said operation with respect to said structural model, third means for computing structural parameters for said operation as a function of objects identified, and fourth means for implementing said operation on said information.

In accordance with another aspect of the invention, a graphic editing method is provided for a system including a data interface surface and user controllable means for generating information on said surface. The method comprises the steps of drawing a line image on the surface in response to a user action for performing an operation on at least a portion of said information, selectively determining a table, diagram, list, and outline model structures in response to said line image generation for said information on said surface in accordance with said operation, identifying said information affected by said operation with respect to said structural model, computing structural parameters for said operation as a function of objects identified, and implementing said operation on said information.

In accordance with another aspect of the invention, a graphic editing system is provided including a data interface surface and user controllable means for generating information on said surface and memory means for storing information. The system comprises first means responsive to a user action for generating a line image on the surface, second means responsive to said line image generation for searching through memory and recognizing said line as a command gesture for performing an operation on at least a portion of said information, third means for selectively defining said information as a table, diagram, list, and outline model structures in accordance with said operation, fourth means for implementing said operation associated with said command gesture, and fifth means for displaying said information in accordance with said implementation.

In accordance with another aspect of the invention, a graphic editing method is provided for a system including a data interface surface and user controllable means for generating information on said surface and memory means for storing information. The method comprises the steps of generating a line image on said surface in response to a user action, searching through memory in response to said line generation and recognizing said line as a command gesture for performing an operation on at least a portion of said information, selectively defining said information as a table, diagram, list, and outline model structures in accordance with said operation, implementing said operation in accordance with said command gesture, and displaying said information in accordance with said implementation.

In accordance with another aspect of the invention, a graphic editing system is provided including a data interface surface and user controllable means for generating information on said surface. The system comprises first means responsive to a user action for generating a line image on said surface, second means responsive to said line image generation that recognizes said line as a command for performing an operation on at least a portion of said information, third means responsive to command recognition for defining said information on said surface as a list comprising at least one vertical column of line items separated by spaces in accordance with said operation, and fourth means for implementing said operation associated with said command gesture.

In accordance with another aspect of the invention, a graphic editing system is provided including a data interface surface and user controllable means for generating information on said surface. The system comprises first means responsive to a user action for generating a line image on said surface, second means responsive to.said line image generation that recognizes said line as a command for performing an operation on at least a portion of said information, third means responsive to command recognition for defining said information on said surface as a list comprising a plurality of line items, each having specific indentation level in accordance with said operation, and fourth means for implementing said operation associated with said command gesture.

BRIEF DESCRIPTION OF THE DRAWINGS

The invention is illustrated by way of example and not limited by the figures of the accompanying drawings in which like references denote like or corresponding parts and in which:

FIG. 5(*b*) illustrates the gestures employed in a system incorporating the present invention;

FIG. 5(*c*) illustrates a flowchart of the basic control operations of the system which supports implicit structures according to the present invention;

FIG. 5(*d*) illustrates an expanded flowchart of the operations shown in FIG. 5(*c*);

FIGS. 6(*a*)–6(*m*) illustrate operations and gestures on handwritten lists;

FIGS. 8(*a*)–8(*j*) illustrate operations and gestures on handwritten text;

FIGS. 9(*a*)–9(*h*) illustrate operations and gestures on handwritten tables;

FIGS. 15 and 16 illustrate alignment operations on a table; and

FIGS. 17(a)–(h) illustrates operations on and the behavior of freeform text.

DESCRIPTION OF THE PREFERRED EMBODIMENT

Figure 1:
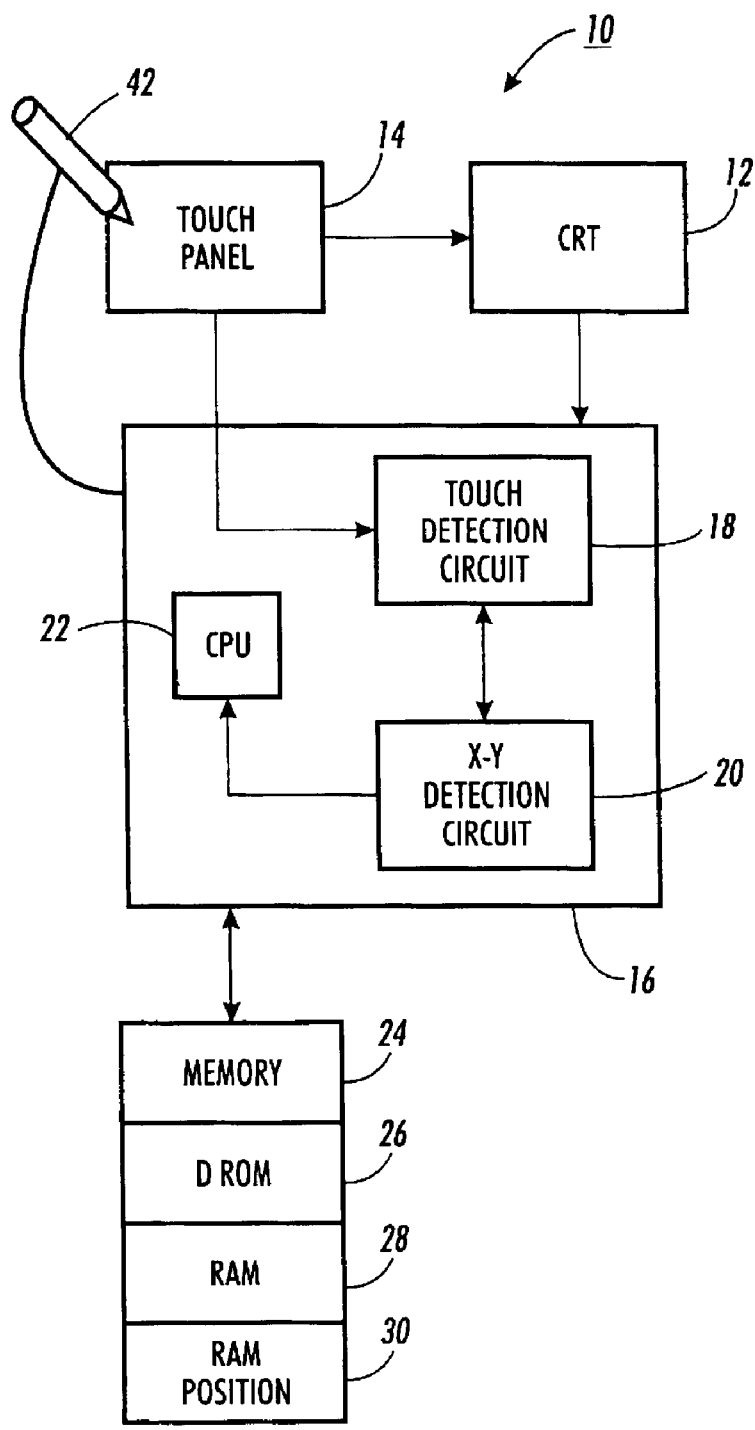
FIG. 1 is a block diagram illustrating one form of gesture based input apparatus in which the system according to the present invention can be employed.

The design discussed can be defined by a set principles. Such design principles include the following:

1. The drawing area is always regarded as a plain two-dimensional surface on which the user can enter any object, in freeform, anytime. There are no restrictions on its use.

2. There are a set of gestures (i.e., strokes that are interpreted by the system) for selecting groups of strokes and operating on them. For example, a loop gesture selects some strokes and a pigtail gesture deletes them.

3. Except for the selection enclosure (defined by a selection gesture), all information on the display consists simply.of strokes, which are amenable to the common stroke operations, such as coloring, thinning, moving, shrinking, erasing, etc. There are no special kinds of objects, such as bullets or cell lines.

4. There are no predefined structural groupings of the strokes by the system. But the system can, upon demand, interpret the current set of strokes as any one of several different kinds of structures.

5. By means of gestures, the user can indicate an intent to temporarily regard part of the current display as a particular kind of structure. For example, a left bracket gesture selects a group of strokes and regards them as an item in a list.

6. When a selection is regarded as a particular kind of structure, then any operation on that structure is performed according to the structural assumptions of that structure. For example, when a plain selection is moved, it is simply positioned in its new location; but when a list item is moved, space is created for it and the space remaining is closed.

7. When a selection of a particular type is dismissed, the structural assumptions are no longer observed. That is, no record of the structuring is retained.

With these principles, there are no modes or predeclared structures. Structural assumptions are at the user's moment-by-moment discretion. That is, these principles give the user temporal flexibility. The user also needs spatial flexibility, i.e., the ability to delimit the spatial scope of what is regarded as structured. There are two more principles:

8. A technique is provided for putting "borders" around material on the display, which limit the spatial scope of structures. The simplest technique is to simply regard very long strokes (relative to the kind of structures being evoked) as border lines. For example, the user can limit list operations to the left side of a page by drawing a long line down the middle of the page, which will act as a border. When the user selects a list item on the left side of the page, the extent of the item will stop at the border line.

9. There may be objects on the display that do not fit into the current structure being evoked (e.g., vertical lines between columns of a table do not belong to a selected row, even though they go through the row). Such objects are considered to be "ambient" and are left undisturbed in the structural operations.

There are a set of common, generic structures—lists, outlines, text, tables, and diagrams—that share many structural assumptions, and thus such structures are treated together in a unified design, such as using common gestures and families of similar gestures across the different structures. Finally the system assumes that the user will invoke a particular structure only when in fact the material on the display conforms to that structure (up to some level of "noise"). Thus, the user can invoke a table operation on a node-link diagram, and the system will carry it through without checking that it makes sense. These principles are effected in the following system description.

Referring to FIG. 1, there is shown a block diagram of the gesture based input system 10 including a CRT display 12. A transparent pressure sensitive type drawing surface. 14, i.e., touch panel, is attached onto the surface of CRT display 12. Drawing surface 14 is touched by a user and the touch is detected by touch detection circuit 18.

The detected signal from touch detection circuit 18 is input to an X-Y detection circuit 20. X-Y detection circuit 20 processes the input signal and performs an arithmetic operation or the like. Thus, the X-Y detection circuit 20 detects the (x, y) coordinates of the input point touched on the surface of drawing surface 14 and transmits such information to CPU 22. Touch panel detection circuit 18, X-Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and pattern data area to store various kinds of character patterns or the like. RAM section 28 of memory 24 includes a RAM portion which is used as a work area of CPU 22 and a character position data area 30 to store display positions of character patterns and the like.

Figure 2:
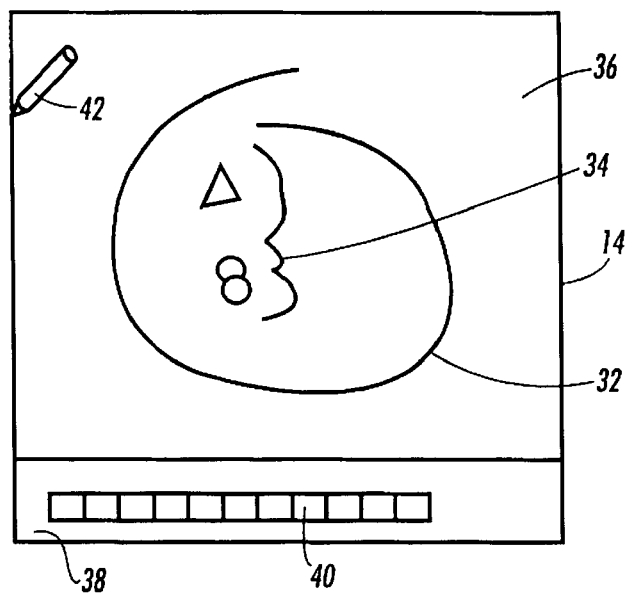
FIG. 2 is an elevational view of a display screen with a freeform loop gesture enclosing several objects.
Figure 3:
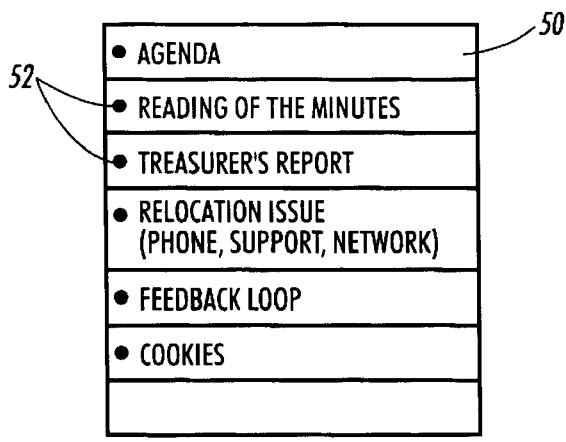
FIG. 3 illustrates a conventional prior art pen-based outlining system.

Specifically, in FIG. 2 drawing surface 14 is an electronic input device such as an electronic sketch pad, liveboard or whiteboard which employs a working surface and may employ a plurality of accessible functions 40 as is shown. The working surface is the upper area 36 of drawing surface 14 and the accessible functions 40 are positioned at the bottom area 38 of drawing surface 14. These functions 40 may include new operation (draw mode), delete, move, shrink and so on. Alternatively, these functions can be accessed by a pop-up menu. These functions however are optional in designation, their principal objects being to define operations which are inherent in the operation of the system. These functions may share the some of the same functions that are represented by many designated command gestures.

A suitable user manipulable control or interacting device such as a stylus or light pen or the like 42 is employed to draw input symbols, select functions or draw gestures representative of specified functions. Obviously, other variants within the skill of the art may be employed.

In FIG. 2 the user has created objects 34 and has selected these objects by drawing a freeform loop 32 around them.

The procedures underlying the system are best understood by first examining the process of performing a generic operation on an implicit structure. The key details of the procedures are discussed below.

Figure 4:
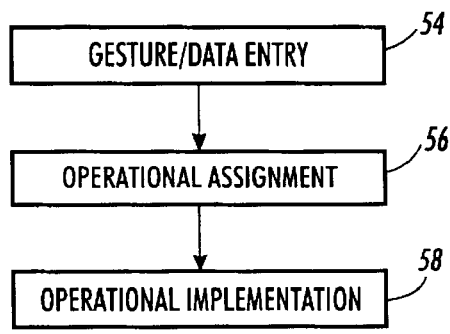
FIG. 4 illustrates a simple flowchart of the basic operations of the system shown in FIG. 1 according to the present invention.

In order to support operations on implicit structures, the system can be broadly characterized to include the following three basic features, as shown in FIG. 4.

(1) Gesture/Data Entry 54; receive data information or command gestures that are drawn as a stroke on drawing surface 14, and interpret the individual stroke as a command gesture in response to some action taken by the user. Such an action may be exerting pressure on a button located near the grasping portion of the stylus 42. There are other means available to instruct the system to interpret a stroke as a command. However, for purposes described herein it is assumed that the system is able to interpret a stroke as a command gesture when the user desires.

(2) Operation Assignment 56; Once command gesture(s) is/are issued by the user, the system scans the program memory to determine the operation or operations assigned to that/those gestures, declare and determine a type of structural model in accordance with the gestures; and (3) Operation Implementation 58; means for executing or performing that operation or operations with respect to the desired data.

Figure 5A:
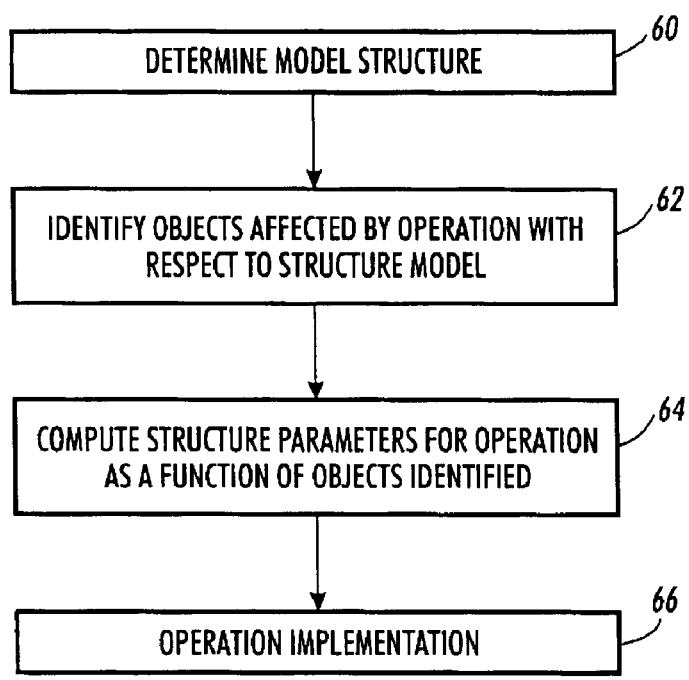
FIG. 5(*a*) illustrates an expanded flowchart of the operations shown in FIG. 4.

Features (2) and (3) consist of the following four sub-features which are shown by blocks 60, 62, 64, 66 in FIG. 5(a).

(1) Determine structural model;
(2) Identify the local objects under the structural model that will be affected by the operation;
(3) Compute structural parameters for operation as a function of the objects identified; and
(4) Operation implementation.

At block 60 a structural model is declared and a particular model type is chosen according to the combination of gestures used to make a selection and used to act upon the selected information.

A model structure is first called by a gesture used to define an operation. That is, a specified gesture for selecting desired information on the display alerts the system that such information shall be treated within a basic structural model context. These specified selection gestures create the structured, i.e., rectangular, enclosures 67 shown in FIG. 5b. In the preferred embodiment, the structured enclosures are created by drawing brackets gestures (up and down brackets 68 and 70 and left and right brackets 72 and 74), an underline gesture 75, or L-shaped gestures 76. These selection gestures are collectively known as structured selection gestures. The recognition techniques for these gestures are quite simple, because of the easily distinguishable features of such gestures, such as corners and orientation.

After the structured selection gesture is drawn, the system creates the structured enclosure by a concept known as projection, subject matter disclosed in U.S. Pat. Ser. No. 08/175,841, filed Dec. 30, 1993, (attorney docket XRX-150) entitled Apparatus and Method for Altering Enclosure Selections in a Gesture Based Input System described above. With structure selection gestures, the segments (legs portion) of the gesture are partially projected to some predetermined border. These projected segments are called extensions. All of the data falling within the area defined by the projected boundaries are selected. For example, the ends of a left bracket gesture "[" are projected horizontally to the right until some predetermined border is reached to terminate the projection. All of the data falling within the extension boundaries of the projected bracket gesture are selected. The L-shaped gesture works in a similar manner. In the case of an underline gesture, the system identifies the "line" of text above or touching the underline, and selects the objects on the line that lie between the endpoints of the gesture.

On the other hand, selection made by freeform loop 32 however is merely a selection of items for future operation having no regard for specifying and/or organizing such information according to any structural model. In order to move the selection made, the user may use the (unstructured) move gesture 77.

Figure 5B:
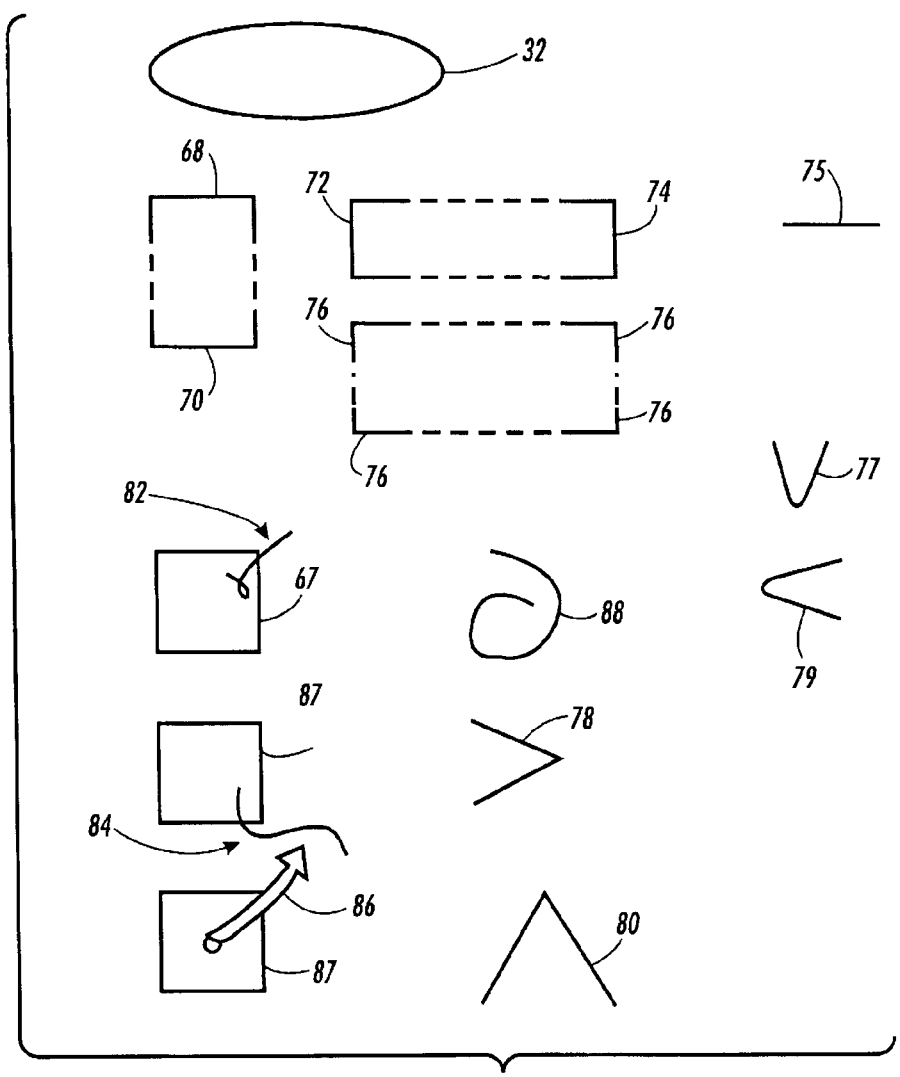

In most situations the model type, i.e., the precise structure of the information is not determined until the user executes a second command on that selection of items, i.e., draws a second (structured) gesture. Examples of these gestures are also shown in FIG. 5(b). Such gestures may include delete 82, move 84, shrink 88, copy 79 and drag (dynamically) 86. This list however is not limited. The details of the specific models, their operations and these and additional gestures are described below. Some command gestures, in particular the wedge and the caret, can also be employed without a preceding selection gesture.

In another embodiment, however, the first gesture (and sometimes the second) indicates the model and selects some set of strokes within the model, then a second gesture specifies the action to be performed on the selected strokes.

At block 62, the system identifies the local objects that will be affected by the operation with respect to the structural model. The system at this point operates by grouping strokes into structures (e.g., line items) and partitioning a set of strokes relative to those structures. For example, to move a line item, the system must identify what strokes belong to the line item, identify the line items at the destination (to determine the inter-line gap), and partition the remaining strokes on the screen according to whether they are above or below the source line and above or below the destination gap. From these partitioning, line spaces are easily derived. The line grouping technique is described further below.

In the case of column structures, procedures analogous to those for lines are used to group strokes into columns, find column gaps, and partition strokes left and right of columns. For the text model however; there is a set of procedures to partition strokes within a line into those that are to the left and to the right of the selection or of the destination of a move. Note that there is no need for a word grouping procedure because the user groups words explicitly by the bracket gestures. In order to move a group of words, the system need only to perform line grouping at the source and destination, so that it can move the left and right line subsegments apart at the destination and back together at the source. Where only a partial group selection is made, the system can make certain assumptions to complete the grouping. For example, an underline gesture will require the system to find the line boundaries.

In all cases, ambient and border strokes are identified by looking for objects that are very large relative to the selected structures.

At block 64, the system computes the structural model parameters for the operation as a function of the local objects identified above. The required procedures include computing baselines, line and column spacing, and word spacing. There are also special algorithms, such as those for computing the parameters for collapsing subtrees in an outline structure.

In sum, the system has determined the structural model, the affected objects, and the structural model parameters. The final function is to implement the operation 66, i.e., execute the desired operation which involves straightforward manipulation of the objects on drawing surface 14. For example, to move a line to a location higher on the page, the lines between the source and destination are moved downward, and the line is moved up into the resulting space, and the vacated line space is removed.

The key procedures or steps are those that find the implicit structures. A typical procedure is the one for grouping lines. A related procedure determines baselines. Fundamental to both of these procedures is one that determines the density of the "ink" in the horizontal cross-sections of the screen. A top-down description of these procedures is provided below and pertinent portions thereof are set forth in Appendix A.

Given a point, say the endpoint of a move gesture or the top point of a caret gesture (to open a word space), the LineGrouping procedure finds the strokes that belong to the line containing the y-coordinate of the given point. The procedure computes the top and bottom boundaries of the line and then tests all the strokes on the screen, collecting those that "reside" on the line. The criterion for a stroke residing on a line is that more than half of the vertical extent of the stroke must lie between the top and bottom line boundaries.

The procedure FindLineBoundaries is based on the ink density function. This density is represented discretely by an array. The screen is partitioned into horizontal strips and the "density of the ink" is computed for each strip. This array of values is then converted to binary values (0 or 1) by applying a threshold, which is expressed as a fraction of the average density. By employing smaller or larger thresholds, the ink density can be used to find line boundaries or text baselines.

Note that other, more sophisticated procedure could be used (e.g., steps that can deal with skewed lines).

Figure 5C:
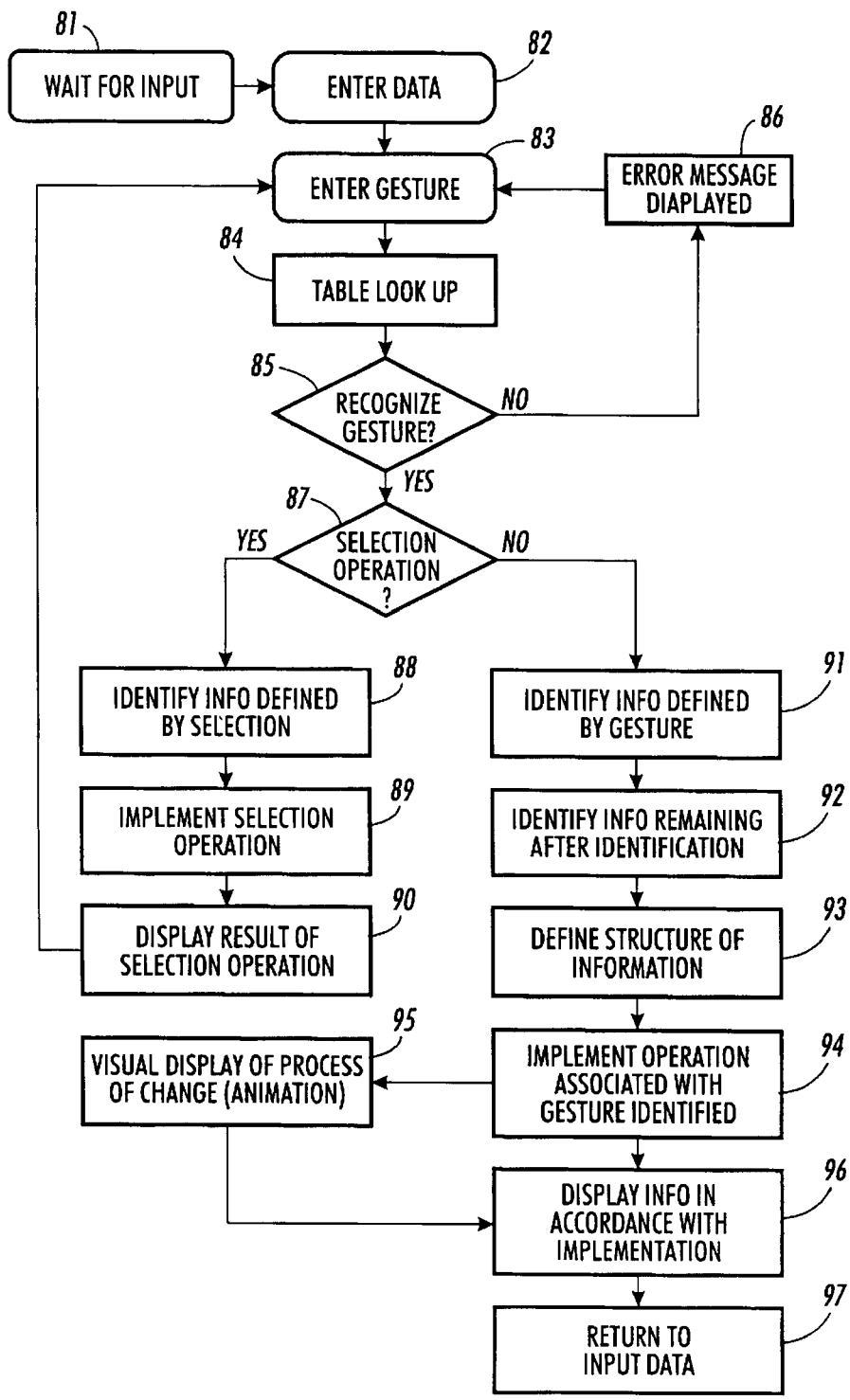

FIG. 5(c) is a flowchart of the basic control operations which implement the system procedures described above. These operations are as follows.

At block 81, the system is inactive until the user enters data 82 by any of the means described above (stylus, scanning, typed entry, etc.). Once data is entered into the system, the user may draw a gesture on the drawing surface 14 at user action FIG. 83. At block 84, the system then detects that a gesture is entered and performs an analysis on the shape of the gesture to categorize it as one of the gestures known to the system. At decision diamond 85, if the gesture is not recognized by the system, an error message is displayed at block 86 and the system returns to user action FIG. 83 for a new gesture entry. If the gesture is recognized, then the system determines whether the gesture is one for selecting desired data. At this point it is noted that the system also determines the type of selection gesture because the type of selection gesture determines whether the system performs a standard data operation or data operation within a structural context. The details of the type of selection gestures and their attributes however are discussed below with respect to the flowchart in FIG. 5(d).

If the gesture is a command for selection then the system will identify the data information defined by the selection at block 88, implement the operation of selection at block 89 and display the result of the implemented operation at block 90. The system then returns to user action FIG. 83 where the user may enter another gesture.

Now if a gesture other than a selection gesture is detected, then the system will identify the information defined by the gesture at block 91, identify the remaining information data after the identification at block 92, and define the structural model for the information based on the gesture and previous information identified. A structural model may be a list, table, diagram, or outline. For example, list is characterized as a column line items (each item consisting of a row of graphic objects), and when an item is moved then the column is rearranged to create space for the item and close the space remaining after the move. At block 94, the system implements the operation associated with the gesture identified (move, shrink, delete, etc.). The system then displays the process of the change of information in accordance with the operation at block 95 (called animation), and also displays the result of the information in accordance with the implementation at block 96. The system then returns to FIG. 81 where the system waits for input.

Figure 5D:
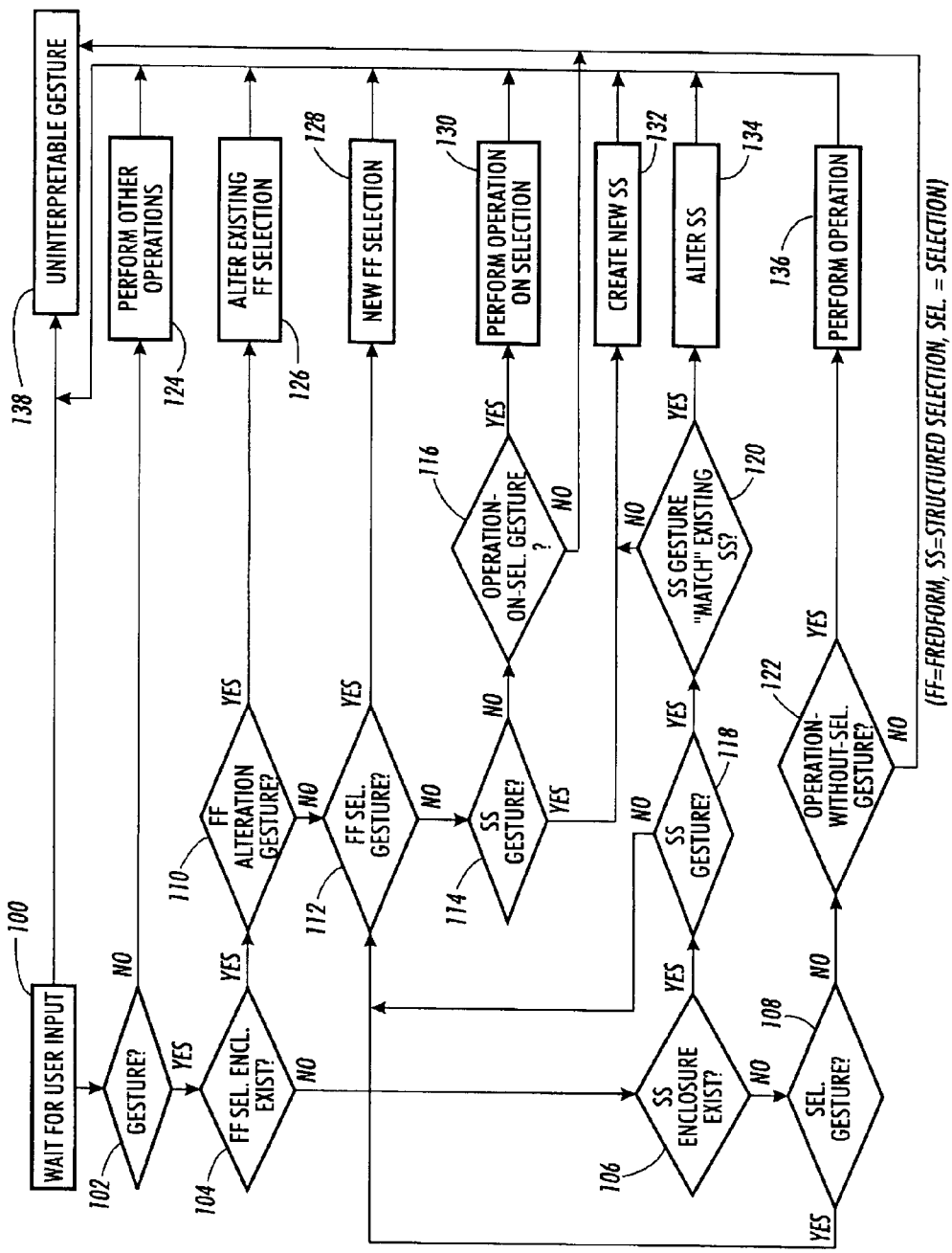

The operations of the flowchart illustrated in FIG. 5(c) and the description thereof are shown in expanded form in the flowchart shown in FIG. 5(d). The text for each element in the flowchart FIG. 5(d) and the corresponding reference numeral are set forth below.

100 Wait for user input; the system is inactive at this step.

102 Is input a gesture?; Once the user enters information, the system determines if the information is a gesture. If information is not a gesture then the system moves to block 124 and performs other operations. Otherwise the system advances to decision diamond 104.

104 Does freeform selection enclosure already exist?; If a freeform selection enclosure exists then the system advances to block 110. Otherwise if no freeform selection exists then the system moves to decision diamond 106.

106 Does a structured selection enclosure already exist?; If a structural selection exists then the system advances to decision diamond 118. If no structured selection exists the system moves to decision diamond 108.

108 Is input a selection gesture?; If the input information is a selection gesture then the system advances to decision diamond 112. If it is not a selection gesture the system advances to decision diamond 122.

110 Is input a freeform alteration gesture?; If the input information is a freeform alteration gesture then the system advances to block 126 and alters the existing freeform selection gesture. If it is not a freeform alteration gesture then the system advances to decision diamond 112.

112 Is input a freeform selection gesture?; If information is a freeform selection gesture then the system advances to block 128 and creates a new freeform loop and returns to block 100. If the input is not a freeform selection gesture then the system moves to decision diamond 114.

114 Is input a structured selection gesture?; If input is a structured selection gesture then the system moves to block 132 and creates a new structured selection. (A structured selection gesture encloses information to be regarded according to one of the structural models. These gestures include brackets and L-shaped figures. Details of these gestures are described below.) If the input is not a structured selection gesture then the system moves to decision diamond 116.

116 Is input an operation-on-selection gesture?; If input is an operation on a freeform selection gesture then the system advances to block 130 and performs the operation. If it is not, then the system causes an error signal to appear indicating a uninterpretable gesture.

118 Is input a structured selection gesture?; Here a structured selection already exists. So, if the input is a structured selection gesture then the system moves to decision diamond 120 and determines whether the structured selection "matches" the existing selection gesture. The term "matching" is described below. If the input is not a structured selection gesture then the system returns to decision diamond 112 and determines if the input is a freeform selection.

120 Does structured selection gesture "match" existing structured selection?; If the input structured selection matches the existing structured gesture then the system advances to block 134 and alters the existing selection gesture. Otherwise the system advances to block. 132 and creates a new structured selection and removes the pre-existing selection enclosure. "Match" means that the material selected by the new gesture overlaps the existing structured selection in a way appropriate to the type of the selection. For example, if the area defined by a projected selection gesture intersects the area of an existing rectangular selection, the selections "match", and the existing selection will be extended or contracted so that the projected selection gesture becomes one of its boundaries. However, strict intersection may not be necessary. For example, if the existing structured -selection fits the "wrap around text" model (text which continues from line to line), then the gesture would be interpreted as marking a point in the line-to-line flow.

122 Is input an operation-without-selection gesture?; If the input is a gesture that acts without a selection gesture then the system advances to block 136 and performs the operation. Otherwise an error message will appear indicating an uninterpretable gesture has been entered.

124 Perform, other operations; self defining.

126 Alter existing freeform selection; same.

128 Create a new freeform selection; same.

130 Perform operation on existing selection; same.

132 Create a new structured selection; same.

134 Alter existing structured selection; The existing structured selection enclosure is reshaped to include the alteration gesture.

136 Perform operation; self defining

138 Signal uninterpretable gesture to user; same.

Details of the Implicit Structures Supported

1. Handwritten Lists

A. Structural Model:

A list is assumed to be a vertical column of line items (or just items for short) separated by line spaces. An item is usually a line of text. It is therefore assumed to be wide and not very tall. Thus since a left-sided bracket at the left of an item is an efficient way to select text, this gesture is the preferred form of selection in this model. In a list the vertical space between items is minimized. When an item is deleted, the remaining space is removed, (i.e., the items below it are moved up). Items however cannot lie on top of one another. Consequently, when a line item is moved between two other items, space is created for the new item. List operations attempt to keep the current line spacing locally intact. But line spacing can be explicitly opened up or closed up. Also, an item may be shifted horizontally to achieve appropriate alignment with other items.

B. Operations and Gestures

As discussed above, a "[" gesture is chosen as the structured gesture and is drawn to select an item or line of items. The height of the "[" defines what is considered to be included in the item. Note however that multiple lines can be included within a "gesture." FIGS. 6(a) and 6(b) illustrate a list of newspaper names. In FIG. 6(a) a left bracket is positioned to the left of "USA Today" to select that entire item. FIG. 6(b) shows the rectangular selection enclosure 150 around the entire item. To expand (or contract) the selection to include (or exclude) line items, an "L" shape gesture 152 is drawn which indicates how the selection figure should be reshaped. Thus, the rectangular selection is reshaped to include the L-shaped gesture and therefore include "USA today" and "Los Angeles Times." This gesture 152 is shown in FIG. 6(c) and the resulting expanded selection enclosure 150 is shown in FIG. 6(d).

If a user wishes to delete the selected item, then he/she may draw a pigtail gesture anywhere from within the selection enclosure. FIG. 6(e) shows this gesture 154. Once the delete gesture is issued, the item is deleted and the remaining two items are moved closer to one another to remove the empty space between such items. FIG. 6(f) shows the remaining two items in the list.

To move the selected item to another position in the list, a user may draw a line gesture 156 from the selection enclosure 150 to a target position, e.g., the location just beneath the item "Los Angeles Times" in FIG. 6(g). The resulting move is shown in FIG. 6(h). Alternatively, the user may move the selected item to the target position by drawing a ">" gesture at the target position (not shown).

In order to shift the selected item horizontally, a user may draw a horizontal line gesture. In order to copy the selected item to another position in the list, the user may draw a "<" gesture at the target position. In order to shrink/expand the selected item, a user may draw an inward/outward spiral gesture 88 as shown in FIG. 5(b).

To quickly make space for new line item when there is no selection, a wedge ">" gesture may be drawn in the space between lines. An example of this gesture is shown in FIG. 6(i). A wedge 158 is positioned between "USA Today" and "Los Angeles Times." FIG. 6(j) shows a space inserted between these items.

In order to drag a selected object, the user touches the very center of the selection region. Once the user touches the center, the selection "sticks" to the pen and the pen slides the image of the selection around until the pen is lifted, at which time space is opened and closed as appropriate and the selected item moves into its proper position. An example of the drag operation is shown in FIGS. 6(k), 6(l), and 6(m).

In FIG. 6(k), "Wall Street Journal" is selected. FIG. 6(l) shows that after dragging this item, it is positioned between "USA Today" and "Los Angeles Times" and positioned to overlap these two items. FIG. 6(m) shows the straightened out list in the order "USA Today", "Wall Street Journal" and "Los Angeles Times". It is important to note that the arrow 86 in FIG. 5(b) represents the motion of the drag operation. However no arrow is actually drawn on the screen for this operation. It is only shown in FIG. 5(b) as one operation available to the user.

It is important to note that other user actions can be used to apply operations that do not depend on the structured nature of the selection. For example, to change the strokes to red, touch the-make-red button.

Handwritten Outlines

A. Structural Model

An outline structure is an extension of the simple list structure. Line items have indentation levels, which determine the hierarchical structure of the items. There are no fixed "tab" positions; the indentation level of an item is determined by whether the horizontal position of the leftmost stroke is "close to" or "significantly" different from the horizontal position of the leftmost stroke of the item above it. There is an alignment operation that shifts items, i.e., aligns the edge of the stroke of each item closest to the left either exactly the same as or significantly different from their preceding items. This operation shows the system's interpretation of the indentation structure.

The user can shift the items to adjust the indentation levels. An outline subtree is the combination of an item and all items below it that have greater indentation levels. Subtrees can be collapsed to show the higher level structure of an outline. Collapsed subtrees are physically shrunk (in the vertical dimension only) so that they appear as thin physical lines, termed container objects, underneath the topmost items in the subtrees. Container objects can be expanded back to their original size. To indicate the presence of the container object, an icon is employed, such as thickened line, or the like. It is important to note that only a proper subtree or a sequence of subtrees or items can be collapsed. If a selection is not a proper subtree or sequence of proper subtrees, it will be extended before collapsing. If the selection is an improper set of items that cannot be extended to a proper subtree, then the collapse operation will be aborted. The container object is treated like a list item, i.e. it can be moved as a block, and otherwise manipulated as desired.

Figure 7A:
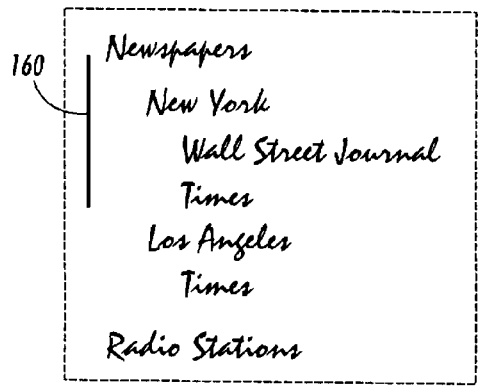
FIGS. 7(*a*)–7(*f*) illustrate operations and gestures on handwritten outlines.
Figure 7B:
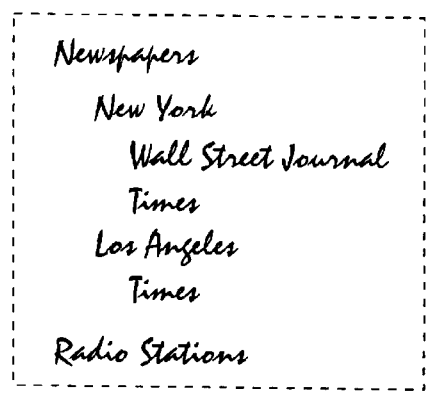

B. Operations and Gesture:

In order to horizontally align the line items in the selection, the user may draw a vertical (a line) gesture at the left edge of the selection. An example of this is shown in FIG. 7(a). Notice the first level heading is "Newspapers" and "New York" is the heading of a subtree. A vertical line gesture 160 is drawn at the left edge of the selected items beginning at "New York". The system compares the indentation of all the line items in the selection, and adjusts the horizontal position of the line items so that lines that were indented by roughly equal amounts are in fact indented exactly equally. The resulting outline is shown in FIG. 7(b).

Figure 7C:
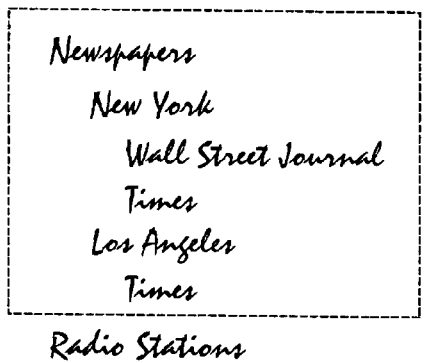
Figure 7D:
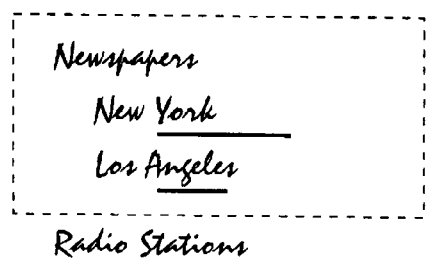

To collapse one level of the selected subtree (i.e., collapse only the lowest level in the subtree), choose the collapse-one-level item from a menu. FIG. 7(c) illustrates the selected items in the outline before the lowest level in the subtree is collapsed and FIG. 7(d) illustrates the outline after that level has been collapsed. Notice that once the lowest level of the subtree has collapsed, the other items not selected, i.e., "Radio Stations" has moved upwards to close the remaining space left from the subtree.

To collapse all levels in the selected subtree (i.e., leave only the topmost level), the user may choose the collapse-all-levels menu item. To expand the collapsed items in the selection by one level (i.e., expand only the highest level of collapsed items), the user may choose the expand-one-level menu item.

Figure 7E:
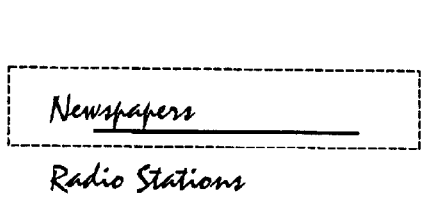
Figure 7F:
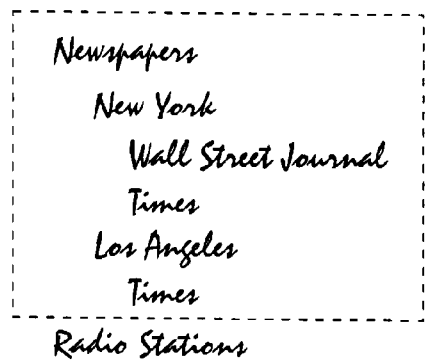

To fully expand the collapsed items in the selection, choose the expand-all-levels menu item. This is shown in FIGS. 7(e) and 7(f).

Handwritten Text

A. Structural Model

Handwritten "text" is a limited model of text within the context of lists and outlines. Strokes of handwriting are first assumed to be grouped as line items and then, within line items, as words separated by word spaces. The term "word" as used in this document refers not to the word of ordinary language, but merely to a horizontal cluster of objects separated by empty space. A sequence of typewritten characters delimited by spaces is a special case of such a "word". Words and word spaces on a line are treated in the horizontal dimension in a way analogous to that of line items and line spaces in the vertical dimension. Word spacing is closed up when words are deleted and opened up to make room for inserted words. Words are contained on a single line and have to be explicitly moved between lines by the user. Contiguous words on the same line can be selected with left and right bracket gestures, or by an underline gesture. When words are moved, the system distinguishes whether a word space or a line space has to be created, i.e., opened up to accommodate them. A line item is also treated this way. That is, a line item just happens to contain all the words on a line.

B. Operations and Gestures

To select words on a line, a user may underline the words or draw bracket "[" and "]" gestures. (Only one bracket is needed if the words to be selected extend to either the left end or the right end of the line.) An example of this is shown in FIGS. 8(a) and 8(b). The word "Angeles" is bracketed for selection. As shown in FIG. 8(c), a user may draw a pigtail gesture 162 from the enclosure 150 to delete the item selected. The result is shown in FIG. 8(d).

To move the selected words to another place on the current line or to a place on another line, a user may draw a line gesture from the selection to a word space, or make a caret gesture "^" a word space. An example of this is shown in FIGS. 8(e) and 8(f). Notice the selection "Angeles" and the line gesture 164 extends from the selection enclosure 80 to the desired location between "USA" and "Today." The system creates space at the desired location to fit the selected information. To move the selected words to a new line, the user may draw a line gesture to a line space or make a ">" gesture in a line space. This is shown in FIG. 8(g). The line gesture 166 extends from the selected information, i.e., "Angeles" to a location between the first two lines of text. The system creates space between these lines of text and moves the selected information. FIG. 8(h) shows the result these operations.

To copy the selected words to a new line, a "<" gesture may be drawn in a line space. To quickly open up space to insert text, a caret gesture may be inserted. The caret gesture 168 is shown in FIG. 8(i). Notice in FIG. 8(j) that space is created between "USA" and "Today." The system creates a fixed amount of space determined as a function of size of the neighboring text.

It is important to note that normal operations can be applied to the selected words. For example, to change the strokes to red, touch the make-red button.

Handwritten Tables

A. Structural Model

A table is a two-dimensional structure, consisting of rows and columns. A row is exactly a line item from the list model. A column is like a row, but with gestures and operations transposed from the horizontal to the vertical dimension. For example a top bracket selects a column just as a left bracket selects a row; columns can be moved horizontally just as rows can be moved vertically. A column space is the vertical space between columns. There is also vertical text (like Japanese or Chinese writing), which is selected with a top and bottom bracket; the material in a column opens and closes vertically when vertical text is moved. In addition to pure row or column operations, a user is permitted to select a block of material—a rectangular selection of material from more than-one row or column, again using left and right or top and bottom brackets. This provides a convenient way to apply simple commands (e.g. make red) to larger portions of a table. However, no special tabular interpretation is placed on a block selection.

B. Operations and Gestures

To select a column or columns, a top bracket gesture 172 can be drawn as shown in FIG. 9(a). FIG. 9(b) shows the result of the action taken in response to this gesture. To delete a selected column, a pigtail gesture can be drawn. To move a selected column, a line gesture can be drawn to the new location as shown in FIG. 9(c) (or make a "^" gesture). In FIG. 9(d), notice the entire center column is moved to the right after the column starting with "3." To copy a selected column, a "<" gesture can be drawn at the new location.

To select a vertical block, top and bottom bracket gestures can be drawn to enclose desired information. This is shown in FIGS. 9(e) and 9(f). To delete a selected block (vertical or horizontal), a pigtail gesture can be drawn from a selection enclosure. This will automatically close up the space (vertically or horizontally). To move a selected block (vertical or horizontal), a line gesture may be drawn from a selection enclosure to the target location. An example of a line gesture is shown in FIG. 9(g) and the corresponding vertical block moved is shown in FIG. 9(h). To copy a block, a "<" gesture can be drawn at the target location.

Finally, the normal operations can be applied to the selected row, column, or block in the normal manner. For example, to change the strokes in a block to red, touch the make-red button.

Border Lines

Figures 10A, 10B:
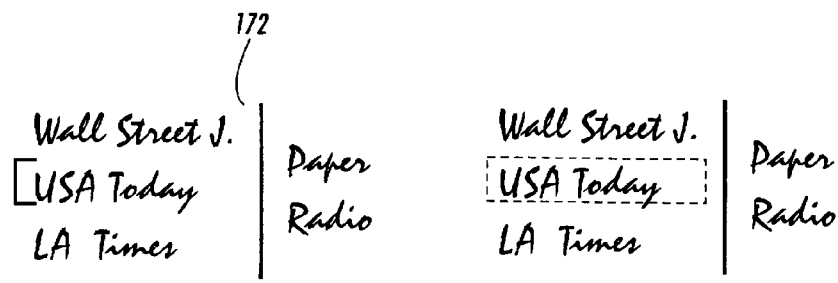
FIGS. 10(*a*)–10(*i*) illustrate operations and gestures with border lines.
Figure 10C:
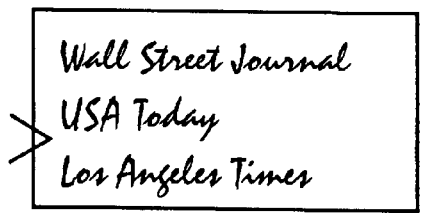

To spatially delimit the scope of any structure, the user can simply draw long strokes to act as border lines. The function of borders is to limit the spatial extent of structural selections and the effects of structural operations. The system regards as a border line any long stroke that it "bumps into" while interpreting a gesture. The extent of a selected structure will automatically be stopped at a border. For example, when selecting an item in a list by a bracket as shown in FIG. 10(a), only those strokes up to the border 174 are included in the selection in FIG. 10(b). Any structural operation that would cause a violation of a border is aborted. For example, the open-up space operation (using a caret) shown between "USA Today" and "LA Times" in FIG. 10(c) would be aborted because the space would cause the last line of the list, i.e., "LA Times" to go through the bottom border.

Figures 10D, 10E:

However, an operation may take place across a border. For example, as shown in FIG. 10(d) an item (USA Today) may be moved from one column to another in a multi-column list (with borders between the columns). Notice that in FIG. 10(e) space was created in the column on the other side of the boundary between "Paper" and "Radio" for the item "USA Today."

To make a selection extend through a border, a corner-shaped gesture or a bracket gesture may be drawn to show where to extend the selection. This is shown in FIGS. 10(f) and 10(g). Notice the original selection enclosure is extended to include information through two borders. When a border line is penetrated in this way, it is no longer regarded as a border, but as an ambient object. Ambient objects are ignored during any operations. For example, ambient lines between columns of a table are unaffected by moving a row. In FIGS. 10(h) and 10(i), a line gesture 176 instructs the system to move a row without affecting the two borders. Ambientness holds only for the life of the current selection.

Handwritten Diagrams

A. Structural Model

A diagram is meant as a node-link structure. A node is a group of graphic objects that is to be regarded as a unit, and a link is a line that goes between (joins, connects) two nodes. The links and nodes form a mathematical (topological) structure, which is more abstract than the geometric structure. That is, the topology is not concerned with where nodes are located or the shape of the links, but only with what the pattern of the links between nodes is. The user may want to change the topology by editing the links, but often the user wants to change the geometry of the diagram (to make it clearer or neater) while preserving the topology.

Figure 11A:
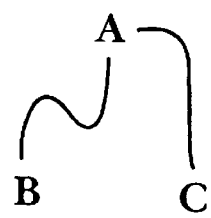
FIGS. 11(*a*)–11(*h*) illustrate operations and gestures on node-link structures for handwritten diagrams.
Figure 11B:
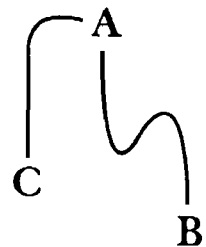

If the user wants to move a node without disturbing the topology, then the links from the node to other nodes must be distorted (reshaped) to maintain the link structure. Distorting a link object involves a linear geometric transformation of the link's shape that preserves its characteristic shape while "stretching" it to fit the new positions of the nodes it connects. Further, the end point of the link is changed relative to its node if the move requires it. For example, FIG. 11(a) shows a simple diagram with three nodes (A, B, and C) and two links (A-B and A-C). FIG. 11(b) shows the diagram changed geometrically—the positions of nodes B and C are reversed and node B is lowered a bit—but with its topology preserved: A is still linked to B and to C. Note that the characteristic shapes of links A-B and A-C are preserved. Also, note that link A-C emanates from the right side of node A in FIG. 11(a) and from the left side of node A in FIG. 11(b).

B. Operations and Gestures

Figure 11C:
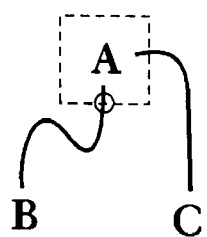
Figure 11D:
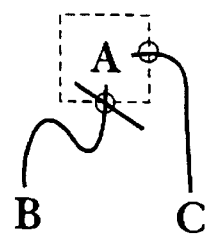
Figure 11E:
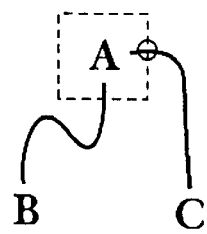
Figure 11F:
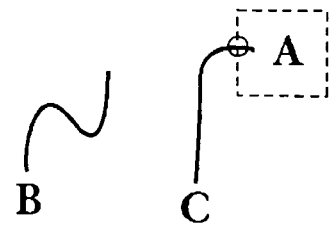

The user can select objects on the display as a node by making a rectangular-shaped gesture. The system recognizes this shape and replaces the drawn gesture with a perfectly geometric rectangle, just as it does for all the other structured selections. A node selection has one added feature that other structured selections don't have. A node selection selects all the objects it enclosed as the node, and all lines that extend out of the selection are selected as links. A selected link is indicated by a little circle on the selection rectangle where the link crosses it. The user can change whether a crossing line is to be regarded as a link or not. For example, FIG. 11(c) shows node A selected and line A-B selected as a link, but line A-C not selected as a link. FIG. 11(d) shows gestures for changing the links. The slash gesture through the little circle removes the link status of the line A-B, and the little-circle gesture where line A-C crosses the selection rectangle changes line A-C to be regarded as a link. The result of these two gestures is shown in FIG. 11(e). When node A is moved to the right, link A-C is distorted to preserve the connection, but line A-B is not changed (because it is not considered a link), and the connection between A and B is lost.

There is also an operation (available from a menu) called grouping. When a set of objects are selected and grouped, all the objects in the selection are regarded as one single object, a group object. The advantage for a user of a group object is that it can be selected simply by touching it, i.e. by a dot gesture. This makes it very easy for the user to manipulate group objects. If the nodes in a diagram are grouped (but not the links), then the diagram can be rearranged easily while preserving the topology. Further, because the system knows what objects constitute the links, it can make sure that the links emanate from the nodes in the proper orientation.

Figure 11G:
Figure 11H:
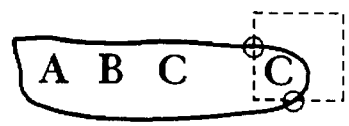

One further extension of this technique is that the link distortion capability can be used to perform geometric transformations on stroke objects that are not really links. For example, FIG. 11(g) shows three character objects and a stroke object around them. The character object C is selected as a node. Because the enclosing stroke object intersects the enclosure rectangle in two places, it is regarded as a "link." The line gesture indicates that the node (the C) is to be moved to the right. But when it is moved, the stroke object is distorted to follow the C, as is shown in FIG. 11(h). This extension illustrates, again, the principles of implicit structuring—that the structure is not "inherent" in the graphic data, but rather structure is what the user sees in the data and "tells" the system by means of gestures, to find.

Mixed Structure and Freeform Command

Figure 12:
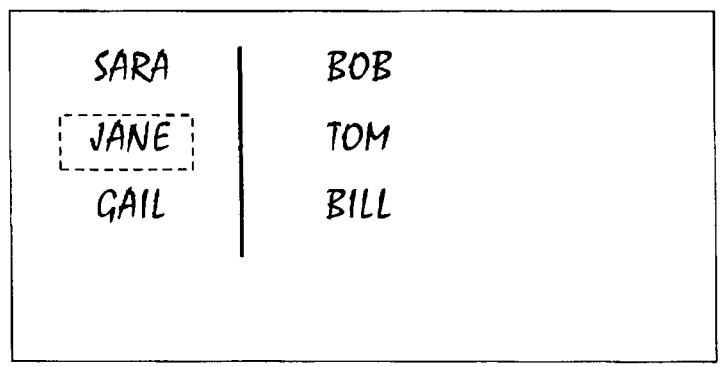
FIG. 12 illustrates operations of completely structured data.

In a display employing multiple regions of data, certain problems are encountered in dealing with cross application of editing operations. FIG. 12 shows a screen with two lists separated by a vertical line that the system interprets as a border. Thus the list on each side may be edited independently (e.g., Gail could be moved to the top of the list). An operation can also affect both lists. FIG. 12 shows that Jane is selected and that a ">" gesture is telling the system to move Jane to between Bob and Tom—Gail will move up and Tom and Bill will move down to accommodate this move. Note that there is a structure on each side of the border, and the move is completely structured.

Figure 13:
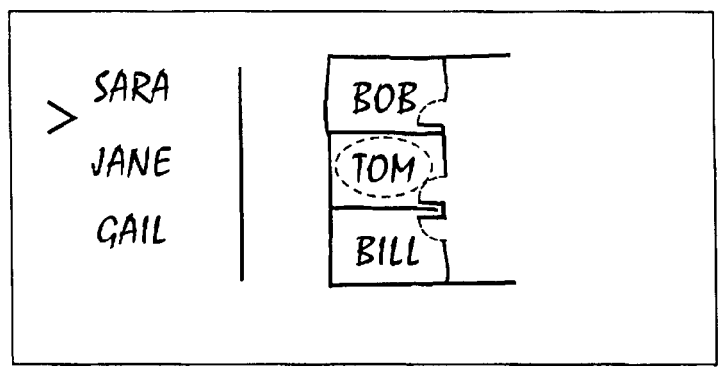
FIGS. 13 and 14 illustrate operations on mixed structures and freeform commands.

Now consider the case in FIG. 13 where there is a list on the left and a partial office floor plan on the right. The floor plan is a freeform diagram, not a structure. Suppose we want to move Jane into Tom's office. If the same gestures are used as in FIG. 12, the system would not know how to alter the diagram properly. It would try to interpret it as a list—in the best case it would move Tom into Bill's office and Bill out of an office; in the worst case, it would move walls in the diagram and make a mess; in this case, the system would refuse to do the operation because, the diagram can't be grouped as a list. Thus, the problem is how to treat the diagram as a freeform and at the same time treat the list as a list.

The solution is to allow mixed operations. Because the selection gesture is different from the move gesture, each gesture can indicate how the material is to be treated at each end of the move. The selection can be structured (brackets and L-shaped) or freeform (loop), and the move can be structured (>or ^) or freeform (V). These can be mixed in all possible combinations.

Figure 14:
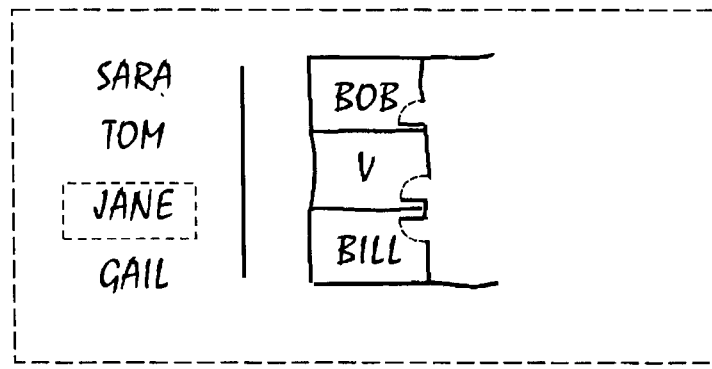

So in FIG. 13, first select Tom with a loop gesture, then structurally insert (>) him in front of Jane. Because Tom is freeform selected, nothing in the diagram is changed when he is moved. Because he is structurally inserted in the list, Jane and Gail move down. See FIG. 14. Now we select Jane as a structured item and indicate a freeform move (V) in the diagram. Because Jane is a structured selection Gail will move up. Because the move is freeform, nothing in the diagram will move there when Jane is moved into the empty office.

Table Alignment

As discussed above, an alignment operation "neatens up" the indentation levels of a list (it can also be used to clean up simple lists). A similar operation is employed for tables. The problem is that tables often are poorly aligned. People often create tables column-wise. They write items going down one column then down another etc. The result is that items in the rows are poorly aligned, and so rows cannot be selected and moved. The solution is to create a horizontal alignment operation. One selects the whole table and makes a horizontal gesture at the top of the selection. The system analyzes the selection as a table, and moves the items successively in each column into horizontal alignment with the items in the columns on the left. The result is a neater table that can be manipulated row-wise. FIG. 15 shows a table created by a user, and FIG. 16 shows it after the system aligned it up. The alignment may include spacing, and both vertical and horizontal alignment of rows and columns.

Typed Characters as Freeform Text

This system allows characters to be typed in at the keyboard. Each character is a freeform graphic object, similar to a stroke, i.e., it just occupies an xy position on the display. Just like strokes, they are treated as freeform or as being structured depending on what gestures are used. Character objects and stroke objects can be mixed; e.g., the user can handwrite a Greek letter in a line of typed text.

Figures 17A, 17B, 17C, 17D, 17E, 17F, 17G, 17H:
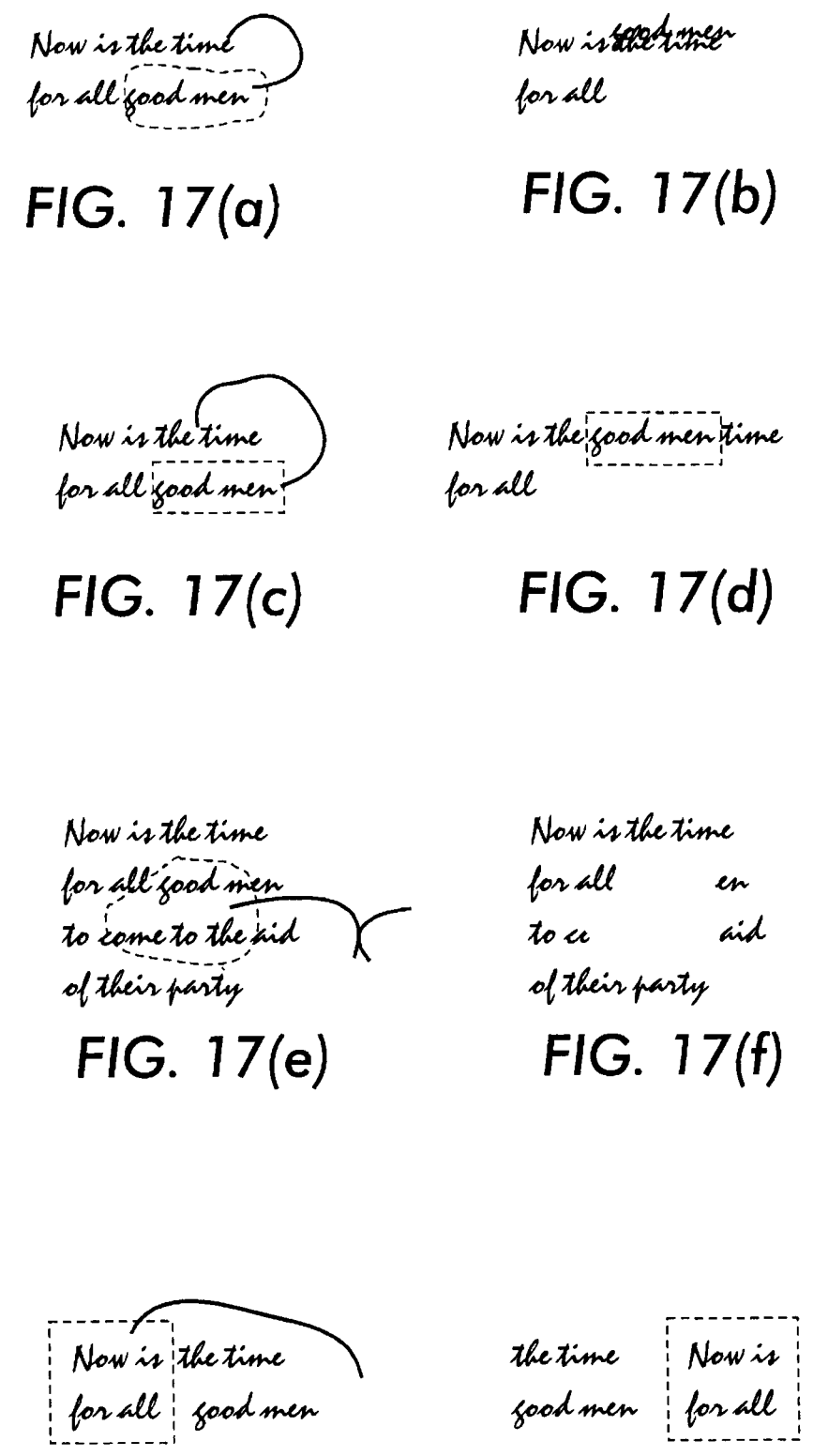

Character objects can be treated as freeform (unstructured) by selecting them with a loop selection gesture. When character objects selected this way are deleted with the standard pigtail gesture, the character (and other kind of) objects surrounding the deleted character objects are not moved. (i.e., exactly the same behavior as for stroke objects.) Similarly, the character objects can be moved anywhere, even to sit on top of other character or stroke objects. See FIGS. 17(a) and 17(b).

Character objects can be treated as structured by selecting them with one of the structure selection gestures (e.g. brackets and L-gestures). When character objects are selected this way, they can be operated upon just like the structured (i.e., list, outline, text, and table) operations on stroke objects. For example, a set of horizontally related character objects can be selected with bracket gestures and then moved with a line gesture to another place; the character objects will close up and open up appropriately. See FIGS. 17(c) and 17(d). However, when character objects are selected, they receive special treatment in that they are "snapped" into alignment with nearby character objects.

For example, if a user moves characters ABC to near characters DEF, then ABC is snapped to be aligned with DEF in the most appropriate way, such as the baselines being aligned and the DEF either occurring right after ABC or with exactly one normal character space between C and D.

Additional operations are provided to allow entry and editing of text with a keyboard. First, the user needs a way to tell the system where typed character objects should be placed on the display. Thus there is a special object called the "type-in point" (a small caret-shaped object). The user can position or reposition the type-in point either by making a dot gesture with a pen or by pointing and pressing a mouse button. Whenever a character-producing keyboard key is pressed, a character object is placed at the right of the type-in point and the type-in point is moved over to the right of the inserted object. Thus a series of keystrokes produces a left-to-right sequence of character objects.

When "special" keys (e.g., Space, Tab, Return, Backspace) are pressed, special actions are provided. When the Space key is pressed, the type-in point is moved one character space to the right. Note that no "space character" is produced; the only affect is to move the type-in point. (Pressing the Space key is totally equivalent to repositioning the type-in point with the mouse.) If the type-in point has character objects to its immediate right, then they are pushed to the right to make room for the new character object. Pressing the Return key causes the type-in point to be moved to the left of the leftmost character on the current row of characters and then down one row so that the next character will go on the next text line (if there are characters immediately below they are pushed down by one row). A Tab key causes the type-in point to be moved to the right to align with any character objects above with space to their left; if no alignment can be found, then the type-in point is moved to a default table position. If the type-in point is pushed into a border or to the right edge of the display, then it (along with character objects to its immediate left) are moved down one row and to the left, i.e., the normal "line wrapping" behavior for text. Similarly, other special keys (e.g., Backspace, Linefeed) have appropriately-defined behaviors.

This treatment of characters produces the capability and behavior normally expected of a simple text editor. Note, however, that the character objects are totally freeform, no matter how they were input. For example, the user can loop-select a set of character objects in the middle of a typed paragraph and delete them, leaving an empty space in the middle of the paragraph. See FIGS. 17(e) and 17(f). The user can also treat the character objects in a structured way that is different from the way they were input. For example, even though some text was typed in from left to right, the character objects do not have any special left-to-right relationships (such as the conventional "string" structure of conventional text editors) ; part of that same text can be selected as a column and two columns of character objects can be switched. See FIGS. 17(g) and 17(h). This is a novel and flexible way to treat text, which is appropriate for a freeform editing application.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

APPENDIX A

```
LineGrouping: PROCEDURE [Coord y] RETURNS[ObjectList]
        ObjectList strokesOnLine = EMPTYLIST;
        Coord lineTop, lineBottom;
        [lineTop, lineBottom] = FindLineBoundaries(y);
        FOR object In GetStrokesOnScreen() DO
            IF ResidesOnLine(object, lineTOP, lineBottom)
                THEN AddToList(strokesOnLine, object);
        RETURN strokesOnLine;
FindLineBoundaries: PROCEDURE[Coord y] RETURNS [Coord, Coord]
        InkDensity density = YDensity(LineBoundariesThreshold);
        Coord lineTop = GoUpUntilDensityIsZero(y, density);
        Coord lineBottom = GoDownUntilDensityIsZero(y, density);
        RETURN [lineTop, lineBottom];
    FindBaseline: PROCEDURE [ObjectList strokesOnLine] RETURNS [Coord]
        InkDensity density = YDensity(BaselineThreshold);
        Coord yMid = YMidpoint(BoundingBox(strokesOnLine);
        RETURN GoDownUntilDensityIsZero(yMid, density);
    YDensity: PROCEDURE [float threshold] RETURNS [InkDensity]
        InkDensity density;
        FillWithZeros(density);
        float dy = ScreenHeight/NStrips;
        --Compute raw stroke density
        FOR object IN getStrokesOnScreen() DO
            FOR i IN [0..NSTrips] DO
                IF ObjectContainsInterval(object,i*dy,(i + 1)*dy)
                    THEN density[i] = density[i] + 1;
        --Now normalize
        float cutOff = Average(density) * threshold;
        FOR i IN [0..Nstrips] DO
            density[[i] = IF density[i] cutOff THEN 1 ELSE 0;
        RETURN density;
```

What is claimed is:

1. A display-oriented graphical editing system which allows for inputting and editing of data in the form of informal scribbling in handwriting and sketches, and inputting and editing of ASCII characters, the system comprising:

a substantially uniformed unlined display;

means for entering the data, which is unstructured freeform data, anywhere on said unlined display; wherein the structure of said displayed data is undetermined at the time of their entry;

means for selecting an editing operation from among a plurality of editing operations to be performed on at least a portion of said displayed data, the editing operations capable of being performed including selectively editing of script, ASCII and diagrams;

means for designating said portion of said displayed data as at least one particular data structure before performing said editing operation; wherein the at least one particular data structure of said selected portion of said displayed data may be changed after performing said editing operation; and means for performing said editing operation on said selected portion of said displayed data; wherein the operability of said editing operation is independent of the location of said selected portion of said displayed data, and said editing operations include line-wrapping of the script and ASCII characters entered on the unlined display when the one particular data structure is a text data structure.

2. A graphical editing method for a system including an unlined data interface surface configured without pre-set boundaries which define predetermined entry areas for selected data types, and user controllable means for generating unstructured freeform information anywhere on said unlined data interface surface which allows for informal scribbling in handwriting and sketches, and inputting of ASCII characters, wherein the structure of said information is undetermined at the time of its generation, the method comprising the steps of:

drawing a gesture on the unlined data interface surface for performing an operation on at least a portion of said information, selectively determining a data structure, in response to said drawing of said gesture, for at least a subportion of said information on said unlined interface surface in accordance with said operation; wherein said data structure may vary in accordance with said operation and said data structure is selectively each of a list, text, outline, table and diagram located at any location on the unlined data interface surface, and wherein the operation associated with the gesture is the same, irrespective of a location on the display where the gesture is located;

identifying said information affected by said operation with respect to said data structure;

computing structural parameters for said operation as a function of information identified; and implementing said operation on said information.

3. A method for editing data on a display of a graphical editing system comprising the steps of:

entering unstructured freeform data anywhere on said display; wherein said display has a substantially uniform blank unlined presentation, prior to inputting of the data;

designating at least a portion of said displayed data as at least one particular data structure; wherein said at least one particular data structure may be changed; and performing an editing operation on at least a subportion of said designated portion of said displayed data after said designation; wherein the operability of said editing operation is independent of the location of said designated portion of said displayed data, and wherein when the data is designated as text data entered on the unlined display a line-wrapping procedure is made available to a user.

4. The method of claim 3 further comprising interpreting said editing operation as appropriate to said at least one data structure before performing said editing operation.

5. The method of claim 4 further comprising computing structural parameters for said editing operation as a function of said at least one data structure identified.

6. The method of claim 3 wherein said portion of said displayed data is designated as said at least one particular data structure by entering a structured selection gesture which implicitly identifies which at least one data structure to assign.

7. The method of claim 3 further comprising selecting said editing operation to be performed on said portion of said displayed data before performing said editing operation wherein said editing operation designates which at least one data structure to assign.

8. The method of claim 3 further comprising selecting said portion of said displayed data to which said data structure is assigned and selecting said editing operation to be performed on said portion of said displayed data before performing said editing operation wherein both said selection of said portion of said displayed data and said editing operation designate which at least one data structure to assign.

9. The method of claim 3 further comprising selecting, with a freeform gesture, at least a portion of said displayed data to which said data structure is assigned and selecting said editing operation to be performed on at least a portion of said displayed data.

10. The method of claim 3 further comprising selecting said editing operation to be performed by entering at least one gesture on said display.

11. The method of claim 3 wherein said at least one data structure is selected from the group of data structures consisting of a list, text sequence, table, diagram, node-link diagram and outline.

12. The method of claim 11 wherein said list comprises at least one vertical column of line items separated by spaces in accordance with said editing operation.

13. The method of claim 12 wherein said editing operation comprises aligning said at least one column and said line items therein.

14. The method of claim 11 wherein said at least one data structure comprises an outline which comprises a plurality of lines including a first line having a smaller indentation than a second line and wherein said editing operation comprises shifting said indentations to discrete indentation levels.

15. The method of claim 14 wherein said outline comprises a subtree and said editing operation comprises collapsing said subtree so that the lines within the subtree are not displayed.

16. The method of claim 15 wherein said editing operation comprises expanding said subtree so that the lines within the subtree are displayed.

17. The method of claim 3 further comprising designating a second portion of said displayed data other than said first portion of said displayed data and placing a border between said first and second portions.

18. The method of claim 17 further comprising inhibiting said editing operation from being performed on said second portion.

19. The method of claim 17 wherein said border inhibits a selection of at least a subportion of said first portion from extending into said second portion.

20. The method of claim 17 further comprising selecting a subportion of said first portion of displayed data and extending said selection into said second portion.

21. The method of claim 11 wherein said displayed data comprises first and second nodes comprising information, said data structure is a node-link diagram linking said first and second nodes with a link, and said editing operation comprises moving said first node and, in response to said move, adjusting said link so as to continue to link said first and second nodes without moving said second node.

22. The method of claim 21 wherein said link is distortable.

23. The method of claim 21 wherein said link is stretchable.

24. The method of claim 3 wherein said data is entered with a pointing device and said display is a touch panel.

25. The method of claim 3 wherein said data is entered with a keyboard.

26. The method of claim 3 wherein said displayed data comprises graphical objects.

27. The method of claim 3 further comprising undesignating said displayed data as said at least one data structure after said editing operation is completed or after a command by the user to terminate the designation.

28. The method of claim 27 further comprising deleting any record of said data structure previously designated from said system before or during said step of undesignating said displayed data.

29. The method of claim 3 wherein said step of performing said editing operation on said portion of said displayed data comprises leaving undisturbed by said editing operation any displayed data which does not conform to the designated data structure.

30. The method of claim 3 wherein said portion comprises all of said displayed data.

31. The method of claim 3 wherein said subportion comprises all of said portion of said displayed data.

32. A method for editing data on a substantially blank unlined input area of a display of a graphical editing system which allows for informal scribbling in handwriting, sketches, and inputting ASCII characters with an input device, the method comprising the steps of:

entering the data, which is unstructured freeform data, anywhere on said unlined input area of the display; wherein the structure of said displayed data is undetermined at the time of their entry;

designating at least a portion of said displayed data, which has been entered as freeform data, as at least one particular data structure and said data structure is selectively each of a list, text, outline, table and diagram, wherein said at least one particular data structure may be changed from time to time depending upon said designation, thereby creating a structured selection so that, if desired, an editing operation appropriate to said at least one data structure may be performed on at least a subportion of said designated portion of said displayed data after said designation, wherein an editing operation which may be performed includes a line wrapping editing procedure for the data designated as text, in of the unlined input area which is also configured to receive data designated as a diagram.

33. The method of claim 32 wherein said system comprises a memory and said method further comprises generating a line image on said display;

searching through said memory in response to said line image generation to determine if said line image is a command gesture; and if said line image is a command gesture, performing said editing operation in accordance with of a command selected by said command gesture and displaying said displayed data after said editing operation has been performed.

34. The method of claim 32 further comprising selecting said portion of said displayed data to which said data structure is assigned with a first gesture and selecting said editing operation to be performed on said subportion of said displayed data with a second gesture before performing said editing operation and wherein said designation of at least a portion of said displayed data as at least one data structure is implicitly identified by at least one of the gestures from the group consisting of a said first and second gestures.

35. A method for editing data on a substantially uniform unlined input area of a display of a graphical editing system which allows for informal scribbling in handwriting and sketches, and inputting ASCII characters with an input device, the method comprising the steps of:

entering unstructured freeform data anywhere on said substantially uniform unlined input area of the display; wherein the structure of said displayed data is undetermined at the time of their entry;

selecting at least a portion of said displayed data by entering a gesture on said display;

selecting one of a plurality of editing operations configured to be performed on at least a subportion of said selected portion of said displayed data, at least one of the editing operations including text editing operations;

designating said selected portion of said displayed data as at least one particular data structure, thereby creating a structured selection and said data structure is selectively each of a list, text, outline, table and diagram; wherein said at least one particular data structure may vary depending upon each said designation; and performing said editing operation on at least a subportion of said structured selection; wherein the operability of said editing operation is independent of the location of said selected portion of said displayed data, such that data entered at a drawing/text area of the uniform unlined input area can be edited in accordance with both text editing procedures and graphical editing procedures.

36. The method of claim 35 wherein said selection gesture which selects at least a portion of said displayed data either alone or in combination with said editing operation implicitly identifies to the graphical editing system which at least one data structure should be designated.

37. In a graphical editing system having a substantially uniform unlined display and a plurality of available data structures, a method for editing data which allows for informal scribbling in handwriting and sketches as well as ASCII characters at any location on the display and for selection of appropriate text based editing for editing of the handwriting and ASCII characters and appropriate graphics based editing for the editing of the sketches independent of the location of the handwriting ASCII characters, and sketches on the display, the method comprising:

entry of data in an unstructured freeform manner anywhere on said display, wherein said data is not assigned any of the plurality of available data structures at the time of their entry;

selection of at least a portion of said data with a selection command to indicate on which data to perform an editing operation; and interpretation by said system of said selected data to associate with said selected data one of said plurality of available data structures which is selective each of a list, text, outline, table and diagram, whereby the system implicitly determines which of said plurality of available data structures is appropriate based upon said selected data and either said selection command or on said editing operation to be performed; wherein said selected data may be associated with different said available data structure depending upon said editing operation to be performed and wherein, when the selected editing operation is a text editing operation a line wrapping operation is available for text located on the unlined display.

38. The method of claim 37 wherein said available data structures include a list, text, a table, a diagram and an outline.

39. The method of claim 37 further comprising selection of said editing operation.

40. The method of claim 39 wherein said selection command or selection of said editing operation is entered as a gesture.

41. The method of claim 37 wherein said system disregards the selected data structure for said selected data and treats said data as unstructured freeform after said selected data has been interpreted by said system as having at least one of said plurality of available data structures.

42. The method of claim 41 wherein after said system disregards the selected data structure, no record of the selected data structure is retained.

43. In a graphical editing system having a substantially uniform unlined display and a plurality of available data structures, a method for editing data which allows for informal scribbling in handwriting and sketches as well as entry of ASCII characters at any location on the display and for selection of appropriate text based editing for editing of the handwriting and ASCII characters, and appropriate graphics based editing for the editing of the sketches independent of the location of the handwriting and sketches on the display, the method comprising:

entry of data in an unstructured freeform manner anywhere on said display, wherein the structure of said data is undetermined at the time of their entry;

entry of an editing command, and interpretation by said system of said data to associate with said data one of said plurality of available data structures which is selective each of a list, text, outline, table and diagram, whereby the system implicitly determines which of said plurality of data structures is appropriate based upon said data and said editing command; wherein said data may be associated with different said plurality of available data structures depending upon said editing command to be performed and said editing command remains the same irrespective of where on the unlined display the editing command is located.

44. The system of claim 1 wherein the operability of said editing operation is determined solely by said at least one particular data structure of said selected portion of said displayed data.

45. The method of claim 3 wherein the operability of said editing operation is determined solely by said at least one particular data structure of said designated portion of said displayed data.

46. The method of claim 35 wherein the operability of said editing operation depends solely on said at least one particular data structure.

47. The method according to claim 1, wherein the editing operation is appropriately performed anywhere on the display for anyone of the list, text, outline, table and diagram.

* * * * *